United States Patent [19]

Spreen

[11] Patent Number: 4,864,486
[45] Date of Patent: Sep. 5, 1989

[54] PLANK AND FRAME TRANSFORMER

[75] Inventor: James H. Spreen, Stone Ridge, N.Y.

[73] Assignee: International Business Machines Corporation, Armonk, N.Y.

[21] Appl. No.: 226,166

[22] Filed: Jul. 29, 1988

[51] Int. Cl.⁴ ............................................. H02M 7/06
[52] U.S. Cl. .................................. 363/126; 336/175; 336/184; 336/232; 363/141; 363/144
[58] Field of Search .................... 363/20, 21, 71, 126, 363/141, 144; 336/175, 174, 232, 184

[56] References Cited

U.S. PATENT DOCUMENTS

| | | | |
|---|---|---|---|
| 3,368,137 | 2/1968 | Kennard et al. | 336/175 |
| 4,292,665 | 9/1981 | Hersom et al. | 363/141 |
| 4,506,320 | 3/1985 | Koroncai et al. | 363/141 |
| 4,635,179 | 1/1987 | Carsten | 363/144 |
| 4,754,390 | 6/1988 | Felton et al. | 363/141 |

FOREIGN PATENT DOCUMENTS

155427 12/1979 Japan ................................. 363/126

Primary Examiner—William H. Beha, Jr.
Attorney, Agent, or Firm—Robert L. Troike; Frederick D. Poag; George E. Clark

[57] ABSTRACT

A transformer structure includes two planar primary windings in a single plane with one primary winding on each leg of a core. The primary windings are connected in series or in parallel. The secondary structure includes a planar conductor structure about the core. A conductor passes through the core and makes electrical connection to the planar conductor through diode rectifiers. An anti-phase embodiment has dual primary circuits and dual cores with a combined secondary structure. Both plate-form and circuit card form embodiments are disclosed.

12 Claims, 7 Drawing Sheets

PLANK AND FRAME TRANSFORMER

BACKGROUND OF THE INVENTION

1. Field of the Invention

This invention relates to electrical transformers and more particularly to an improved transformer topology employing planar windings for tight coupling, improved heat dissipation, and ease of assembly.

2. Prior Art

Transformer designs have been known in the prior art which employ sheet-form or ribbon-like windings in an effort to capitalize on the economies available through use of so called "printed circuit" techniques. Such printed circuit transformers, although fabricated from sheet-form elements, usually strive to replicate, in printed circuit form, traditional winding patterns, including multi-turn secondary windings on traditional magnetic core structures.

SUMMARY OF THE INVENTION

It is an object of the present invention to provide a class of transformers employing a novel "winding" structure in which the secondary winding is of simple, single turn planar shape which can be formed from bar stock or laminated card stock and in either case provides significant current capacity, heat dissipation, and ease of assembly into the structure of the transformer.

It is another object of the invention to provide a transformer of physical characteristics and lay-out, or topology, as aforesaid in which the primary winding structure is also planar, allowing it to be closely nested with the aforesaid secondary structure for tight coupling and facilitating the embodiment of the primary-winding structure in card form if desired.

It is another object of the invention to provide a transformer having magnetic coupling as tight as that of primary-secondary-primary winding sandwich structure, but with primary windings on only one side of the secondary structure, for reduced height, better cooling, and easier fabrication.

It is another object of the invention to provide a transformer structure and rectifier arrangement in which physically separate but electrically parallel rectifier components share current more nearly equally because of the symmetry imposed by the transformer windings, thereby providing increased current capability with reduced thermal density.

It is yet another object of the invention to provide a transformer structure as aforesaid having embedded diodes, located for minimum inductance in the diode commutate circuit loops, either immediately adjacent to or actually in the window of the transformer core.

According to one aspect of the invention, a transformer structure is provided which includes a core excited by a primary winding and a secondary structure including a planar conductor about the core and a secondary conductor which passes through the core and makes electrical connection to the planar conductor to provide an output.

According to another aspect of the invention, the primary winding in a transformer structure as aforesaid includes two planar winding elements in a single plane, with one element on each leg of the core.

According to still another aspect of the invention, the secondary conductor in a transformer as aforesaid is connected to the planar conductor structure of the secondary through diode rectifiers.

According to a further aspect of the invention there is provided a transformer comprising a core having a window, two primary windings connected together and in single plane with one primary winding on each leg of the core and with both primary windings encircling the same flux path, the path encircling the window, a second structure including at least three rectifiers, and a generally planar secondary structure of two portions that are electrically connected by the rectifiers, positioned to create induced current conductor paths which match the geometry of the primary windings, one of the portions constituting at least in part a generally planar conductor structure about the legs of the core and the other of the portions constituting at least in part a conductor within the window.

Other features, advantages, and aspects of the invention will be apparent from the following description of preferred embodiments of the invention.

DETAILED DESCRIPTION OF PREFERRED EMBODIMENTS OF THE INVENTION

Figure 1:
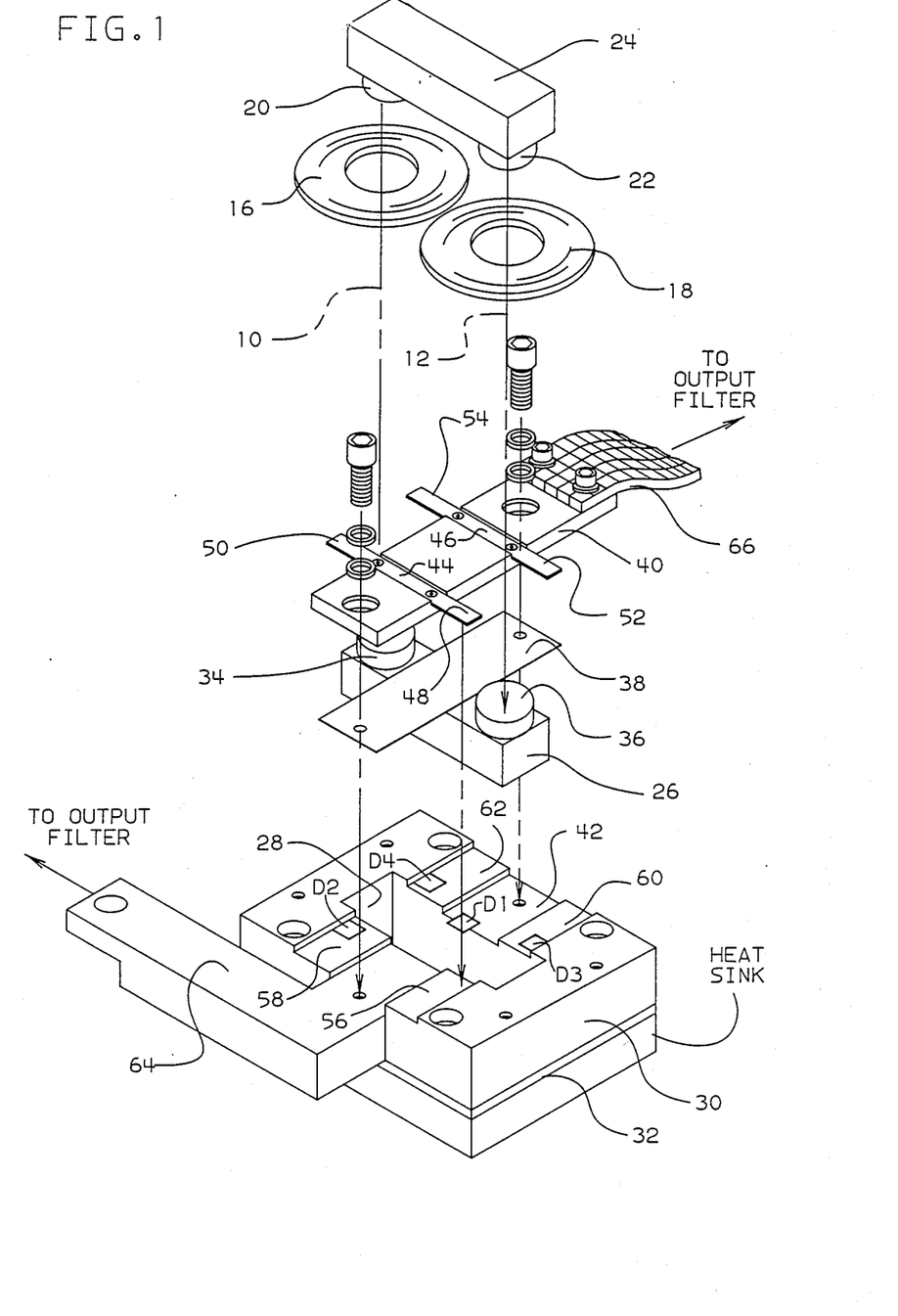
FIG. 1 is an exploded view of a plank and frame transformer embodying the invention.

The transformer structure shown in the exploded view of FIG. 1 is assembled as indicated by the reference lines 10, 12 shown in that figure, so that primary windings 16, 18 fit over pole portions 20, 22 of the upper ferrite core element 24 shown in that figure. A lower ferrite core element 26 is received in a pocket 28 formed by an aperture in a frame 30 and a bottom frame closure plate 32. The lower core element 26 has pole portions 34, 36 which mate with the pole portions 20, 22 of the upper core element 24 and embrace an insulating spacer 38 and a conductive plank 40. In the embodiment shown in FIG. 1, the pole portions 20, 22, 24, 26 give the core elements 24-26 respective C-shapes.

Frame 30 has a trough portion 42 receiving the insulating spacer 38 and the lower portion of the plank 40. Plank 40 carries connection rails 44, 46 extending transversely therefrom at opposite sides of the core structure formed by core elements 24 and 26 and ending in resilient outboard connection tabs 48, 50 and 52, 54 which bear upon diode chips D1, D2, D3, and D4. Diode chips D1 and D2 are interposed between connection tabs 48 and 50 respectively and connector lands 56, 58 machined or otherwise formed in the top surface of frame 30, and diodes D3 and D4 are interposed respectively between connection tabs 52, 54 and connection lands 60, 62 in the upper surface of frame 30. In the embodiment shown in the figure, a conductive arm 64 extends from one side of frame 30, and the plank 40 extends beyond the other side of frame 30 and has attached thereto a braid connector 66.

The transformer structure thus described can be used in a singled ended, pulse driven forward power supply as will be described with reference to FIG. 3 hereinafter, with the conductive arm 64 providing one output connection to the filter thereof and the braid 66 providing the other output connection to the filter, with the diodes D1 and D2 acting in parallel as the rectifier diode of the power supply and the diodes D3 and D4 acting in parallel as the free wheeling diode of the power supply.

When assembled, the ferrite core elements, with their pole portions 20, 22 and 34, 36 form a single, continuous loop for the flux path of the core. The two primary windings 16, 18 are in one plane, with one primary winding on each leg of the core. These primary windings may be wired in series, as in the electrical schematic of FIG. 3, or in parallel. The secondary structure includes a continuous conductor frame 30 encircling the entire lower ferrite core element 26. The plank conductor 40 passes through the core. This plank makes electrical connection to the frame through the rectifier chips D1-D4.

Figure 2:
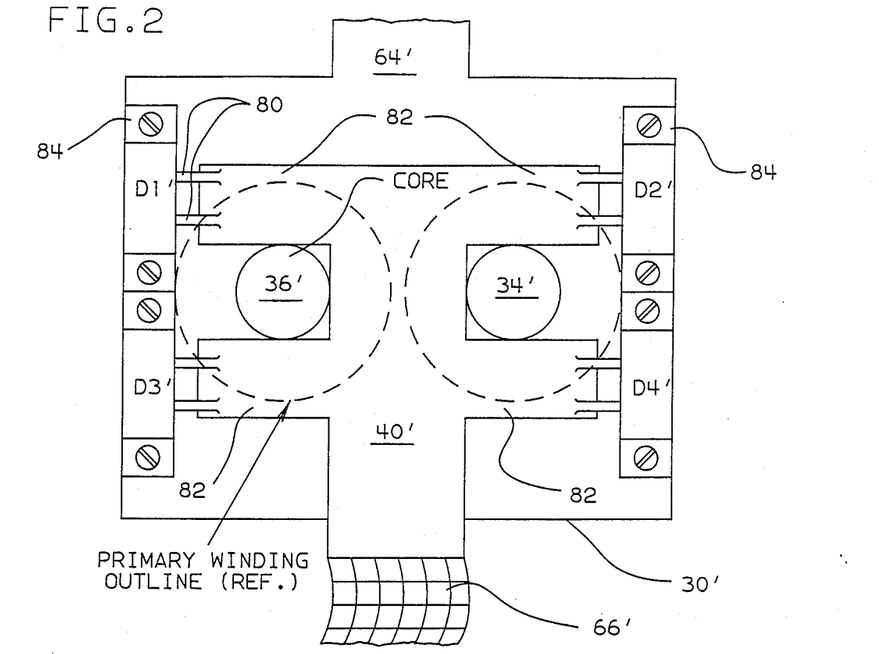
FIG. 2 is a plan view of the secondary portion of a modification of the transformer of FIG. 1 to accommodate outboard packaged rectifiers in place of the rectifiers of the embodiment of FIG. 1.

FIG. 2 shows a variation of the structure of FIG. 1 in which the diodes D1'-D4' are placed outside of the windings instead of being embedded within the magnetic influence of the windings as in the embodiment of FIG. 1. This allows the use of prepackaged diode modules at the expense of possibly reduced magnetic coupling, and thus degraded performance. In the embodiment of FIG. 2 the diodes D1'-D4' are connected by solder or otherwise attached leads 80 to lateral extensions 82 of the plank conductor 40' thereby connecting one side of the diodes (in this case the anode side) to that plank conductor, and by connection tabs 84 connecting the other side of the diodes (in this case the cathode side) to the frame element 30'. The other elements of the embodiment depicted by FIG. 2, including parts not seen in FIG. 2, may be substantially identical to those of the embodiment of FIG. 1, and the operation as described with reference to FIG. 3 would be the same.

Figure 3:
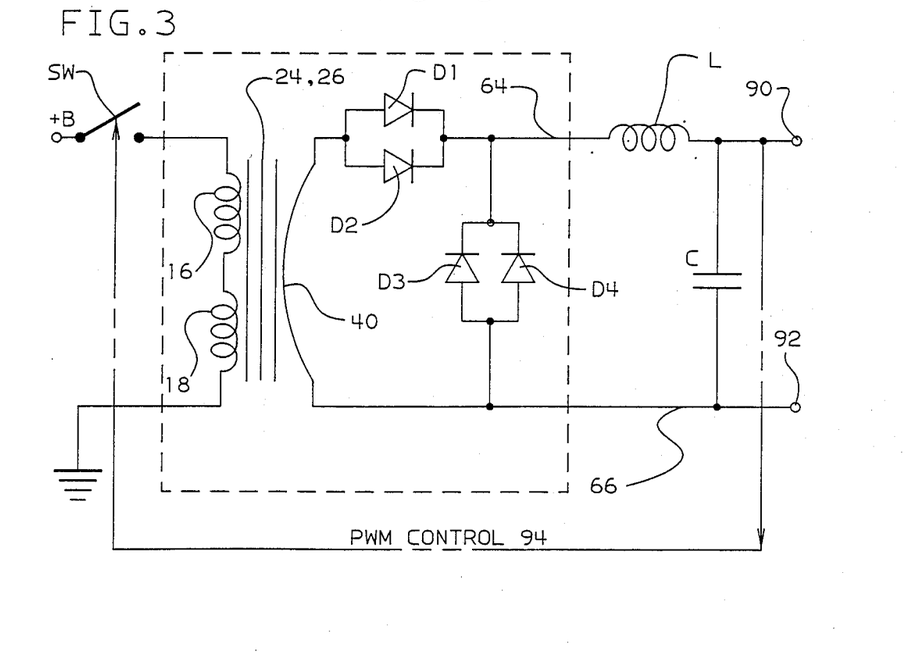
FIG. 3 is an electrical diagram corresponding to the transformers depicted in FIGS. 1 and 2.

FIG. 3 shows a schematic electric diagram representative of the operation of one employment of the structure of FIG. 1 and equally applicable to the structure of FIG. 2. In the electrical diagram of FIG. 3, the aforedescribed transformer structure is shown in terms of the primary windings 16, 18, the secondary "plank" winding 40, the core elements 24, 26 (which of course include their mating pole portions), and the diodes D1, D2 and D3, D4, all as they relate electrically to the outputs 64, 66. Thus, the reference numbering scheme of FIG. 3 corresponds to that of FIG. 1. In the embodiment of FIG. 3, the output (conductive arm) 64 is connected through a filter inductor L to one side of a filter capacitor C and to one output terminal 90 of the power supply. The other output terminal 92 is connected to the return side constituted via the braid connector 66 then to the other end of the secondary or plank conductor 40.

Typically, such a supply is powered by a DC source +B which is connected to the primary windings by a transistor or other suitable switch SW, under the control of a feedback circuit 94, typically a pulse-width modulation (PWM) control which opens and closes the switch SW in accordance with a duty cycle (usually a variable duration pulse of fixed frequency) in a manner to maintain the output potential across terminals 90, 92 constant, all as is well understood in the art.

It will be understood that the transformer structure of FIG. 1, and its variant of FIG. 2 can be employed in a multitude of circuits other than that shown in FIG. 3, the circuit of FIG. 3 being exemplary of one employment only of the invention.

Figure 4:
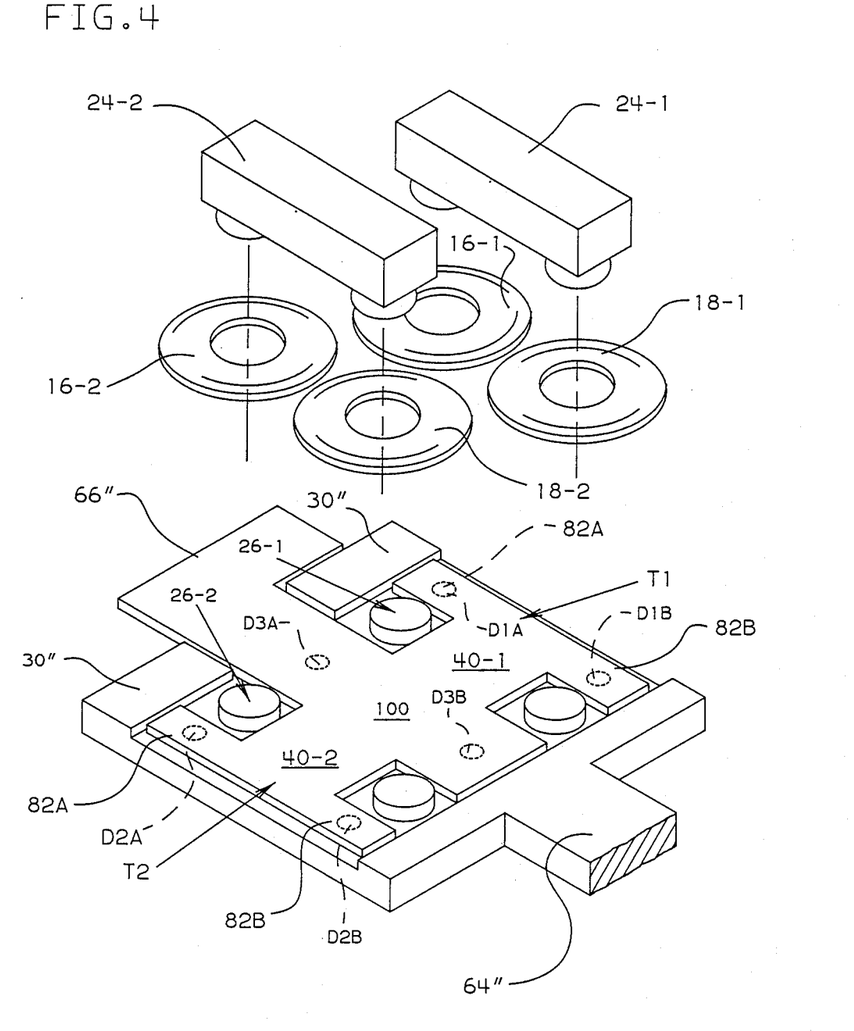
FIG. 4 is an exploded isometric view of another modification of the transformer of FIG. 1, adapted for antiphase operation.

FIG. 4 shows another embodiment of the invention, having a configuration especially useful for anti-phase operation, such as in a high-frequency, high-current switch mode DC - DC power converter which uses dual power trains with anti-phase switching. The general concept of such operation is discussed in an article in the IBM Technical Disclosure Bulletin, August 1982, pages 1426-27, by L. B. Carroll, and the operation of one embodiment will be discussed further with reference to FIG. 5 hereinbelow.

FIG. 4 shows, in exploded view, the various levels in the structure of such an anti-phase plank and frame transformer. The base level includes a conductive frame 30" encircling the bottom portions 26-1 and 26-2 of each of two ferrite cores accepted in respective windows or cavities in the frame 30". The secondary "winding" structure is provided by a plank having portions 40-1 and 40-2 passing through the windows of the respective cores. The medial portion 100 of the plank connects one end of each of the two portions 40-1 and 40-2, in common, to a free-wheeling diode pair D3A and D3B and thence to the frame 30". The diodes D3A and D3B act in parallel to provide a distributed current path, having anodes in contact with the underside portion 100 of the plank and cathodes in contact with the underlying conductive frame 30" at spaced positions as shown. In like manner the outboard ends of the plank halves 40-1 and 40-2 are connected via rectifier diodes D1A, D1B and D2A, D2B, respectively, to the underlying frame 30". Thus the current path can be traced from the connection tab 66" of the plank to the juncture or medial portion 100 between plank portions 40-1, 40-2, where it not only makes connection via diodes D3A and D3B to the frame, but also splits to pass through the windows of the cores, one branch passing through plank portion 40-1 to the positions of diodes of D1A and D1B, and the other branch extending from the medial portion 100 through plank portion 40-2 to the locations of diodes D2A and D2B. Thus, diodes pair D1A and D1B form the rectifier diode for one transformer T1 and diode pair D2A and D2B provide the rectifier diode for the other transformer T2, with diode pair D3A, D3B forming a free-wheeled diode serving in common.

Figure 5A:
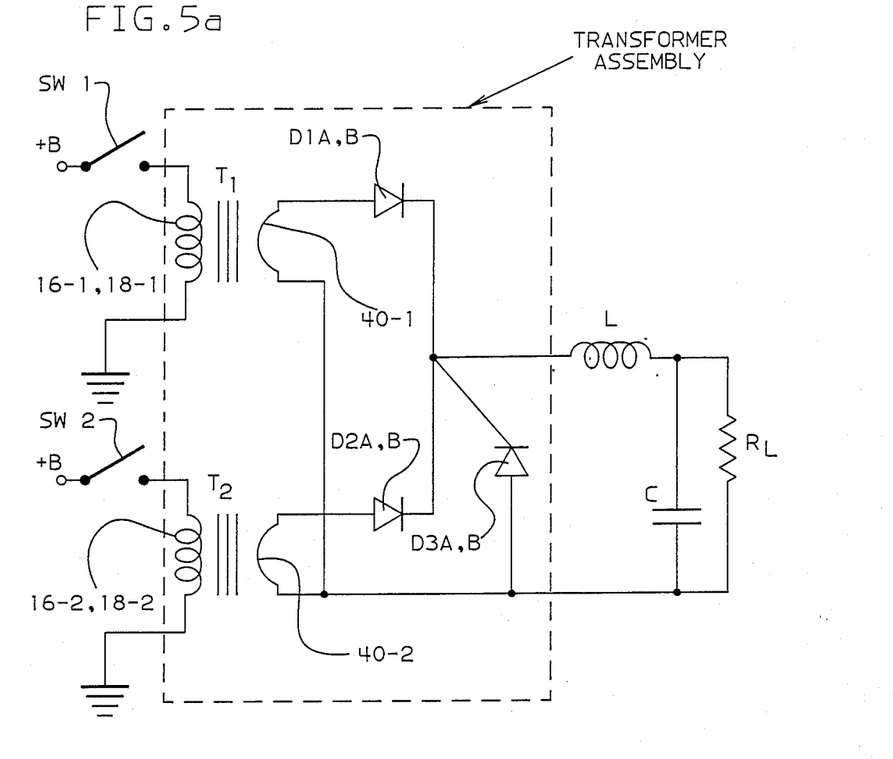
FIGS. 5(a) and 5(b) are, respectively, an electrical schematic and a corresponding timing diagram illustrative of the operation of the transformer of FIG. 4.
Figure 5B:
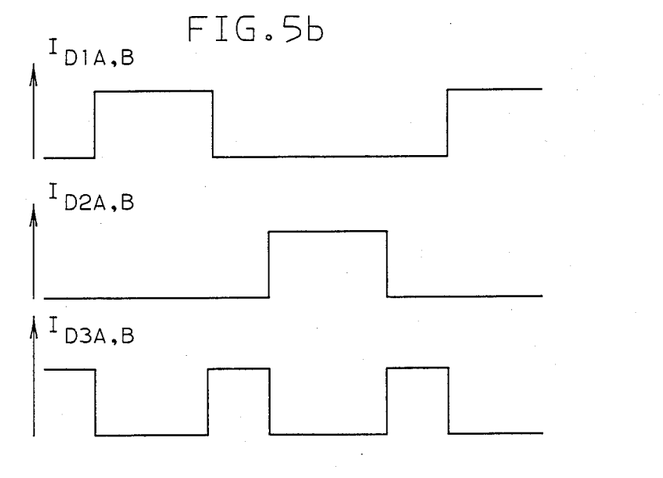

The upper level of the transformer as shown in FIG. 4 consists of the primary windings 16-1, 18-1, 16-2, 18-2 and the top portions 24-1, 24-2 of the cores. When the structure is assembled, the top cores combine with the bottom cores to form two independent transformers T1 and T2 with respective magnetic flux path loops. Each core loop is encircled by the primary winding of the respective transformer T1 or T2, each primary winding being in the form of a pair of two planar spiral windings. All four primary windings are in one plane. The primary windings of each transformer T1, T2 may be wired in series as shown in FIG. 5(a) or in parallel. FIG. 5(a) shows the electrical circuit in diagrammatic form, and FIG. 5(b) shows the corresponding idealized diode conduction timings. In these figures, the parallel diodes D1A, D1B, etc. are shown as equivalent single diodes D1A,B, etc. The two separate power transformers T1 and T2 are powered on the primary side by separate single ended converter circuits. Staggered timing of the on time of the primary switches SW1 and SW2 ensures that the forward output rectifiers DIA,B and D2A,B conduct in "anti-phase" as shown in FIG. 5(b), rather than with any overlap of conduction times. The input to the filter L, C is then twice the frequency of either of the fundamental switching frequency of the primary switches SW1, SW2, thus reducing the filtering required.

The anti-phase plank and frame structure combines transformers T1 and T2 and rectifiers D1A,B–D3A,B in a single structure as shown in FIG. 4 thereby providing improved electrical performance. During the OFF to ON switch transition of either T1 or T2, the output current flowing in the free wheel rectifier D3A,B is commutated to D1A,B or D2A,B.

By incorporating T1; T2; D1A,B; D2A,B; and D3A,B in a common structure with appropriately designed shared electrical connections and induced current paths, the time required for current commutation is reduced. Reduced commutate time results in improved performance of the converter circuit. As in the basic plank and frame transformer structures of the embodiments of FIGS. 1 and 2, the embodiment of FIG. 4 provides mechanical and cooling advantages and, in addition, produces a "bridge-like" double frequency input to the filter while retaining single-ended circuitry and components.

Figure 6:
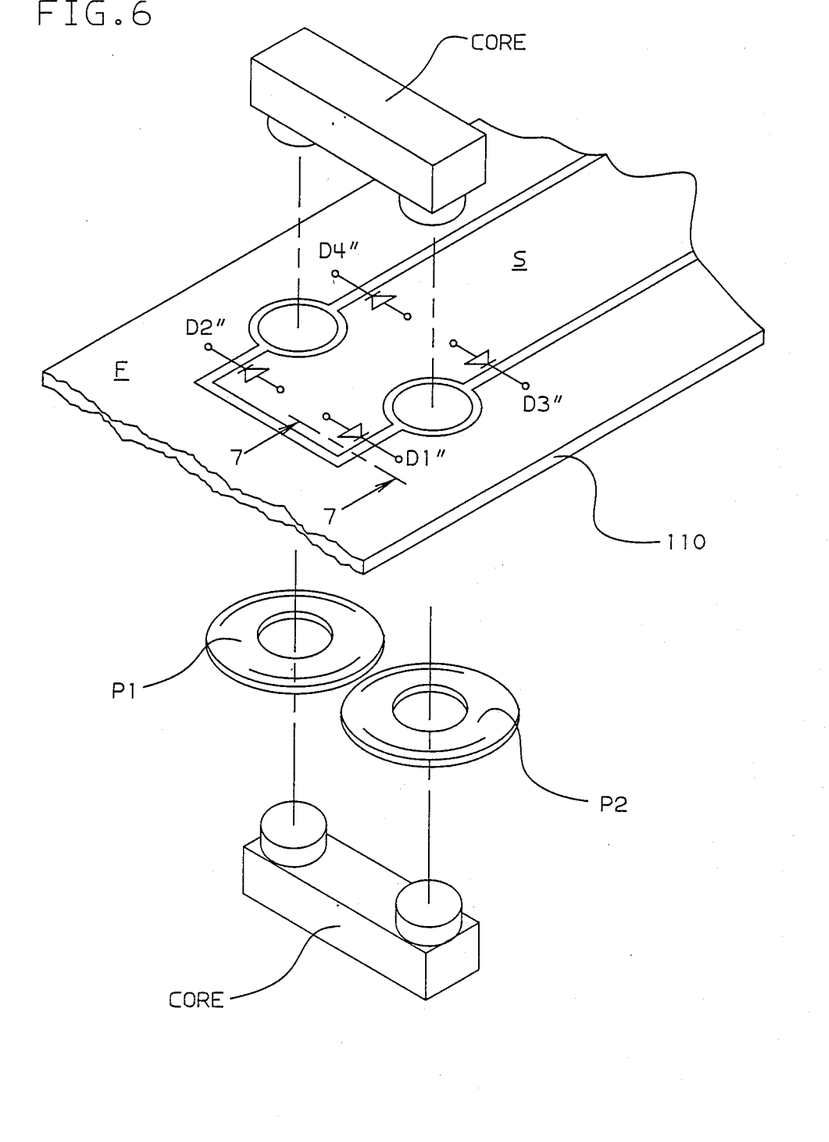
FIG. 6 is an exploded, partly schematic illustration, of a still further modification of the transformer of FIG. 1, including a circuit card-form of the secondary conductor pattern.

FIG. 6 shows still another embodiment of the plank and frame architecture of the invention, but in this case the "frame" is wrapped around one end of the "plank" and is coplanar therewith rather than overlying the same.

As shown in FIG. 6, the secondary conductor pattern consists of only two areas of conductor, the secondary "winding" are S and the frame portion F. Area S passes through the core window and provides one connection to the output filer L, C as shown diagrammatically in FIG. 3. Area F covers the remaining area under the primary windings P1 and P2 and provides the other connection to the output filer. The areas S and F are electrically connected through output rectifiers D1, D2, D3 and D4 whose positions are shown schematically in FIG. 6. Diodes D1 and D2 function as the forward rectifier in a forward converter while diodes D3 and D4 function as the free-wheel rectifier in the same manner as the similarly numbered diode in the embodiment of FIG. 1. Accordingly, the electrical schematic for FIG. 6 would be the same as that for FIG. 1, already shown in FIG. 3 and need not be repeated.

Figure 7:
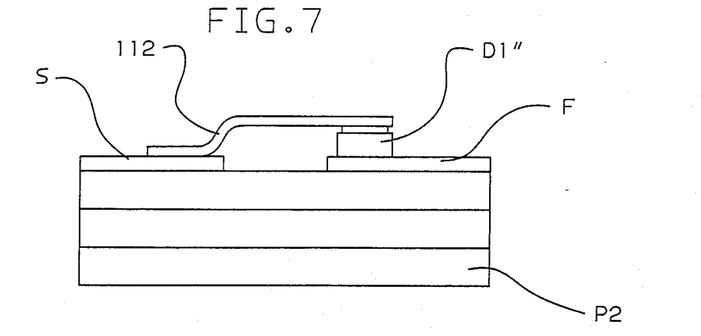
FIG. 7 is a fragmentary cross sectional view, taken along line 7—7 of FIG. 6.

However, in the embodiment of FIG. 6, the primary windings, P1 and P2, are on the opposite side of the card 110 on which areas S and F exist, so that mechanical interference between the primary windings and the rectifiers is avoided. The actual structure of the diode mounts can be formed conveniently, by means of a conductor bridge 112 as shown in FIG. 7, or if desired, a diode package having axial leads could be surface mounted in the same position.

Figure 8:
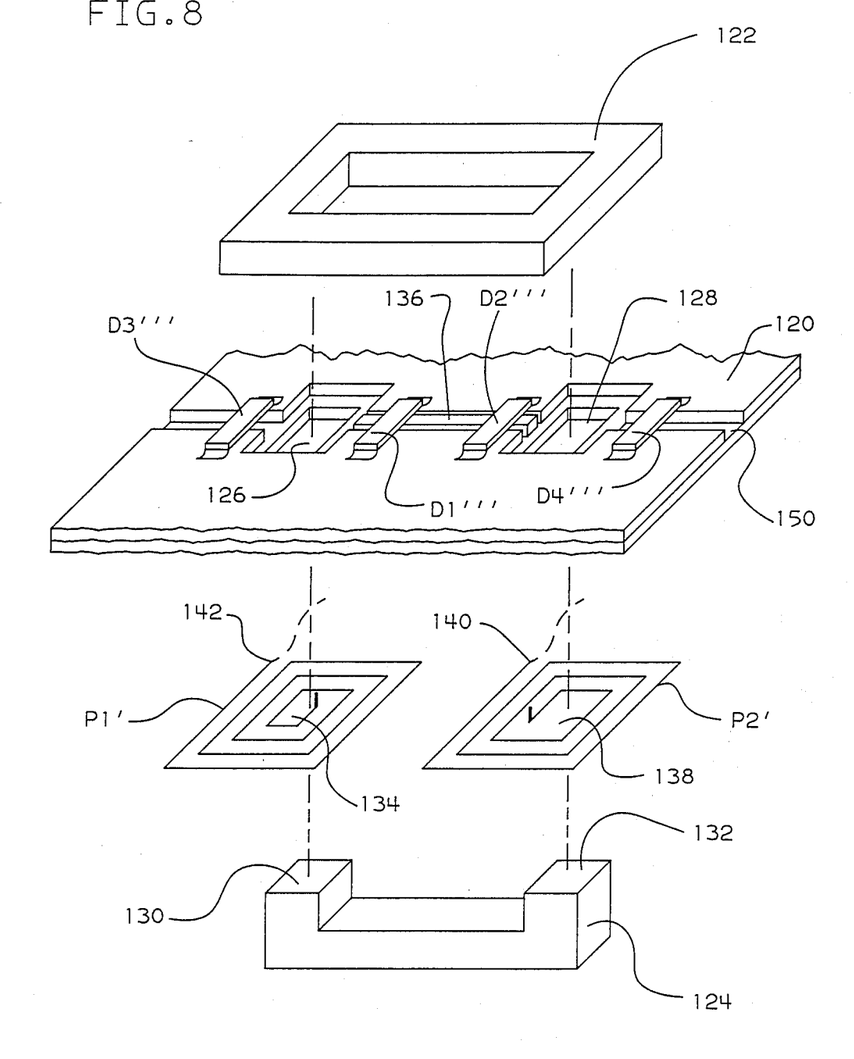
FIG. 8 is an exploded view illustrative of a still further embodiment of the invention, showing a modification of the core structure to accommodate diode elements in a double sided, single circuit card embodiment of the invention.

FIG. 8 shows a single card embodiment wherein all the necessary conductors may be fabricated on one double-sided printed circuit card 120, thus providing a high performance, low cost, easily assembled transformer for high frequency switch mode DC - DC power converters.

In the figure, the secondary side of the card 120 is visible. Ferrite cores 122 and 124 assemble through the holes 126, 128 in the card, as indicated, forming a single, continuous loop for the flux path. The primary winding is fabricated as two separate planar spiral primary coils "P1" and "P2". Although shown spaced from the card 120 in the exploded view, they are actually formed in place or otherwise attached as part of the underside of the card. Each of these coils encircles a leg 130, 132 of the assembled core. The innermost turn of "P1" is connected to the innermost turn of "P2" through a via 134 through the card, a link 136 on the other side of the card, and a second via 138 back to the primary side of the card. Thus, the primary coils "P1, P2" are wired in series forming the primary winding. The two primary connections 140, 142 required between the inverter primary circuit and the primary winding are made, one each, to the outermost turn of each coil.

The embodiment of FIG. 8 shows still another modified aspect in that the secondary winding consists of a two part portion of the conductive surface of the card in the window of the core. A gap 150 medially through that portion conductive surface is bridged by the rectifier diodes D1 and D2 in that "secondary" surface area, while free-wheeling diodes D3 and D4 bridge the gap outside the core window. Moreover, in order to allow a low profile while avoiding interference with the diode Dl, D2 structures, one of the core elements 122 is formed in a frame configuration so as to have a central aperture receiving the diode D2, D3 elements.

In the modified embodiment of FIG. 8, all wiring, including primary circuit connections, primary windings, secondary conductors, rectifiers connections and output filter connections may be fabricated in one double-sided printed circuit card 120. The rectifier positions are fully accessible for surface mounting of the rectifiers. The core pieces 122, 124 drop into place forming a magnetic path through holes 126, 128 in the card. Since the core and the rectifiers may be positioned as shown to avoid mechanical interference with no degradation of electrical performance, the assembly is well suited for applications requiring compact power circuits. The height is the sum of one core piece, a card thickness, plus another core piece or rectifier whichever is higher.

Figure 9:
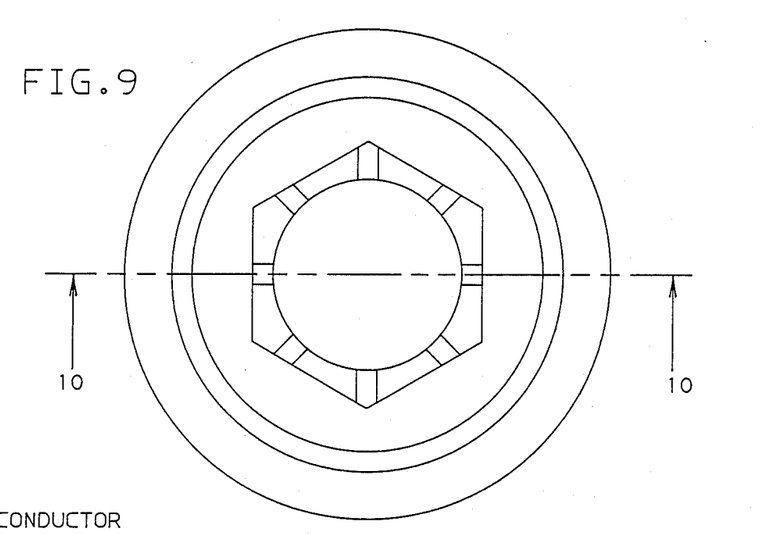
FIGS. 9 and 10 show a detail of a suitable alternative diode mount for the diode chips utilized in the structures of FIGS. 1 and 4, FIG. 10 being a cross-section taken on line 10—10 of FIG. 9.
Figure 10:
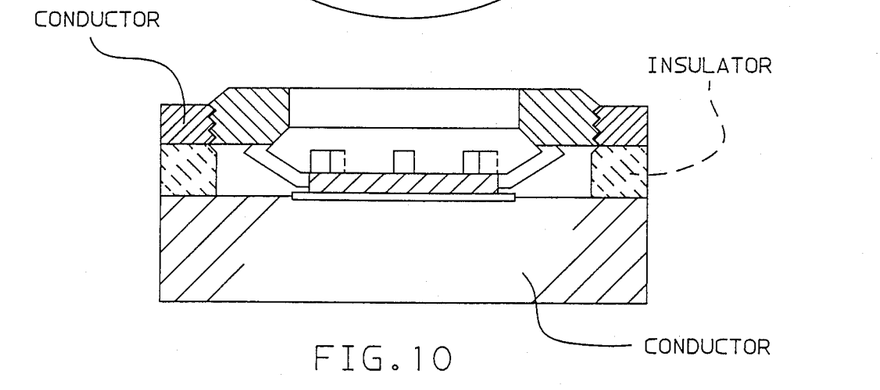

In each of the embodiments shown in FIGS. 1, 4, 6 and 8, the diodes are located within the winding structure, for minimum inductance. During the operation of a forward converter, such as shown schematically in FIG. 3 or FIG. 5(a), it is necessary to quickly commutate the inductor L currents (approximately the output currents) from the freewheeling diodes (D3, D4 in FIG. 3 or D3 in FIG. 5(a)) to the secondary windings (40 in FIG. 3 or 40-1, 40-2 in FIG. 5(a)) nd rectifying diodes D1, D2. This transfer of current occurs when the switch SW in FIG. 3 or SW-1, SW-2 in FIG. 5(a) turns on. A similar commutation of the current from the rectifying diodes back to free-wheeling diodes occurs when the switch turns off. Any inductance in the circuit loop of any secondary winding and diode pair increases these commutate times. Such inductance may be due to actual lead inductance or to the leakage inductance (lack of perfect magnetic coupling) of the respective power transformer. By positioning the diodes inside the planar winding such that the geometry of the commutate current loops matches the geometry of the primary windings the loop inductance can be minimized. In the embodiment of FIGS. 1 and 4 the diodes are implemented as single chip devices, pressured by the resilient tabs 48, 50, 52, 54. As an alternative, they could be embodied as shown for example in FIGS. 9 and 10. Further description of this kind of device is given an article entitled "Low Inductance Chip Connector for Power Rectifiers" published in the IBM Technical Disclosure Bulletin, Vol. 29, No. 3 (August, 1986) pages 1071–1072.

In each of the embodiments of the invention described in detail above, there is provided a transformer having an essentially planar secondary structure having good heat dissipation characteristics and including a secondary "winding" means and a diode-connected output connection frame or the like, and a primary structure having preferred dual flat, coplanar primary windings close to the secondary structure for tight coupling thereto. However, it should be understood that the disclosed embodiments are shown and described only as preferred examples and not by way of limitation, and that the invention can be otherwise embodied within the spirit of the invention and the appended claims.

What is claimed is:

1. A transformer comprising:
   a core having a window,
   two primary windings connected together and in a single plane with one primary winding on each leg of the core and with both primary windings encircling the same flux path, said path encircling said window,
   a second structure including at least three rectifiers and
   a generally planar secondary structure of two portions that are electrically connected by said at least three rectifiers, positioned to create induced current conductor paths which match the geometry of the primary windings, one of said portions constituting at least in part a generally planar conductor structure about the legs of the core, and the other of said portions constituting at least in part a conductor within said window.

2. A transformer according to claim 1, wherein:
   said second structure comprises a frame element and a plank element mounted by and overlying said frame element but insulated therefrom,
   said frame element receives said plank element through said window, and
   two of said rectifiers connect said plank to said frame at one side of said core and one of said rectifiers connects said plank to said frame at the other side of said core.

3. A transformer in accordance with claim 2, including:
   a second core having a second window and received by and mounted by said frame adjacent to the first mentioned core,
   said plank extending beyond said one rectifier to and through said second window and beyond second window,
   two additional rectifiers, said additional rectifiers connecting said plank to said frame at points on the side of said second core remote from said one rectifier,
   said plank being substantially symmetrical about said one rectifier, and
   an additional two primary windings one on each leg of said second core, all of said primary windings being coplanar with each other.

4. A transformer in accordance with claim 1, wherein said second structure comprises a circuit card carrying a conductive pattern.

5. A transformer in accordance with claim 4,
   said conductive pattern is on one side of said card and wherein said primary windings comprise conductive spiral patterns on the other side of said card.

6. A transformer in accordance with claim 5, further comprising:
   a conductive link on said one side of said card connected by vias through said card to said spiral patterns to connect said spiral patterns in series.

7. A transformer in accordance with claim 6 wherein said diodes are mounted as modules on said one side of said card and said core comprises,
   a frame element and a C-core element mating to provide a core window,
   said core frame element having an opening to accommodate at least that or those of said diodes in said core window.

8. A transformer in accordance with claim 7 wherein said portions comprise adjacent conductive areas in said pattern separated by a gap in said pattern in said window, said gap being bridged by said that or those of said diodes.

9. A transformer in accordance with claim 2 wherein said diodes comprise:
   planar rectifier and free-wheeling diode components embedded in said frame element whereby inductance in the circuit loop formed by said secondary structure is minimized and commutating action of the diodes is facilitated.

10. A transformer in accordance with claim 3 wherein said diodes comprise:
    planar rectifier and free-wheeling diode components embedded in said frame element whereby inductance in the circuit loop formed by said secondary structure is minimized and commutating action of the diodes is facilitated.

11. A transformer comprising:
    a core comprising two C-core elements having legs mated to form a continuous magnetic path surrounding a core window,
    a bar of conductive material extending through said window,
    a continuous frame of conductive material surrounding said core substantially in the plane of said bar,
    said bar being mounted on said frame but insulated therefrom,
    and diode means connecting said bar to said frame at opposite sides of said window.

12. A transformer in accordance with claim 11 further comprising:
    a second core comprising a second pair of C-core elements parallel to said first core and spaced therefrom and providing a second window in alignment with the first window,
    said bar extending through said second window, and said diode means being located outboard of both cores and between said cores.

* * * * *